(12) United States Patent
Crowell

(10) Patent No.: US 11,624,276 B2
(45) Date of Patent: Apr. 11, 2023

(54) SYSTEMS AND METHODS OF DETERMINING PRESSURE WAVE EXPOSURE

(71) Applicant: Brisance Corporation, Lake Oswego, OR (US)

(72) Inventor: Jeffrey R. Crowell, Lake Oswego, OR (US)

(73) Assignee: Brisance Corporation, Lake Oswego, OR (US)

( * ) Notice: Subject to any disclaimer, the term of this patent is extended or adjusted under 35 U.S.C. 154(b) by 200 days.

(21) Appl. No.: 16/950,793

(22) Filed: Nov. 17, 2020

(65) Prior Publication Data

US 2021/0355813 A1    Nov. 18, 2021

Related U.S. Application Data

(60) Provisional application No. 63/024,656, filed on May 14, 2020.

(51) Int. Cl.
*E21B 47/06*    (2012.01)
*E21B 33/12*    (2006.01)

(52) U.S. Cl.
CPC .......... *E21B 47/06* (2013.01); *E21B 33/1208* (2013.01)

(58) Field of Classification Search
CPC ......... E21B 47/06; E21B 33/1208; G01L 5/14
See application file for complete search history.

(56) References Cited

U.S. PATENT DOCUMENTS

| | | | |
|---|---|---|---|
| 1,344,722 A | 6/1920 | Schulz | |
| 2,630,939 A | 3/1953 | Jones | |
| 2,875,352 A | 2/1959 | Orlacchio | |
| 3,071,973 A | 1/1963 | Helfand | |
| 6,100,798 A | * 8/2000 | Liang | B60C 23/0433 340/447 |
| 6,925,887 B1 | 8/2005 | Coffey et al. | |
| 8,397,551 B2 | 3/2013 | King et al. | |
| 8,400,636 B2 | 3/2013 | Smith et al. | |

(Continued)

FOREIGN PATENT DOCUMENTS

| | | | | |
|---|---|---|---|---|
| CN | 109459179 A | * | 3/2019 | ............... G01L 5/14 |
| WO | WO 2009/121000 A2 | | 10/2009 | |
| WO | WO-2018042250 A1 | * | 3/2018 | ......... F16K 17/1606 |

OTHER PUBLICATIONS

Blast Occurrence Monitor—BOM brochure; Biokinetics; 1 page.

*Primary Examiner* — Yoshihisa Ishizuka
*Assistant Examiner* — Christopher J Gassen
(74) *Attorney, Agent, or Firm* — Klarquist Sparkman, LLP

(57) ABSTRACT

A pressure dosimeter can include a body-mountable housing comprising a well having a first end portion open to the atmosphere, a second closed end portion, and a cavity. The dosimeter can include a membrane assembly disposed within the cavity, and a sealing member disposed within the cavity between the membrane assembly and the second end portion. The membrane assembly has a diameter less than a diameter of the cavity and a thickness less than a height of the cavity such that it can move within the cavity allowing air to pass around it and into the second end portion. When exposed to a pressure event the membrane assembly is urged against the sealing member, sealing the second end portion. The membrane will rupture at a selected overpressure threshold.

19 Claims, 13 Drawing Sheets

(56) References Cited

U.S. PATENT DOCUMENTS

| | | |
|---|---|---|
| 8,984,664 B2 | 3/2015 | Moss et al. |
| 2010/0229784 A1* | 9/2010 | Bayne ................... F42D 5/00 116/203 |
| 2010/0275676 A1* | 11/2010 | King ..................... G01L 5/14 73/35.14 |

* cited by examiner

SYSTEMS AND METHODS OF DETERMINING PRESSURE WAVE EXPOSURE

CROSS-REFERENCE TO RELATED APPLICATION

This application claims the benefit of U.S. Provisional Application No. 63/024,656, filed May 14, 2020, which is incorporated by reference herein in its entirety.

FIELD

The present disclosure pertains to systems and methods of determining a threshold pressure of a pressure wave, such as a blast wave.

BACKGROUND

Atmospheric shockwaves from explosives are known to cause a variety of injuries including neurological trauma. In the absence of physical symptoms, no methods currently exist for definitive diagnosis of traumatic brain injury (TBI) from exposure to an overpressure event such as an explosive shockwave. Many forms of trauma are not visible using existing CT or MRI equipment, nor can the damage be seen using blood tests. Accordingly, a need exists for devices that can determine and indicate the occurrence of an overpressure event, as well as quantifying the level of pressure exposure.

SUMMARY

In a representative embodiment, an apparatus can comprise a body-mountable housing including a well having a first end portion open to the atmosphere and a second closed end portion, the well having a first diameter at the first and second end portions and comprising a cavity having a second diameter greater than the first diameter. The apparatus can further comprise a membrane assembly disposed within the cavity, the membrane assembly comprising one or more annular frame members and a membrane, and a sealing member disposed within the cavity between the membrane assembly and the second end portion. The membrane assembly has a diameter less than the diameter of the cavity and a thickness less than a height of the cavity such that the membrane assembly can move within the cavity along a longitudinal axis of the well and a lateral axis of the well thereby allowing air to pass around the membrane assembly and into the second end portion. The membrane assembly is configured to seal against the sealing member within the cavity when exposed to a pressure event to seal the second end portion, and the membrane is configured to rupture at a selected overpressure threshold.

In some embodiments, the well is a first well and wherein the housing comprises one or more additional wells and each additional well comprises the first diameter.

In some embodiments, the sealing member comprises an O-ring.

In some embodiments, the housing comprises four wells, and wherein each well comprises a membrane having a different selected overpressure threshold.

In some embodiments, the one or more annular frame members comprise first and second annular frame members arranged such that the membrane is disposed between them.

In some embodiments, the membrane comprises a concave surface oriented toward the opening.

In some embodiments, the housing comprises a first portion and a second portion, the second portion including one or more protrusions extending from a first surface of the second portion, and the first portion including one or more cutouts configured to mate with the one or more protrusions to couple the first and second portions together.

In some embodiments, the membrane assembly is inset relative to an outer surface of the housing.

In some embodiments, the membrane comprises a metallic foil.

In some embodiments, a method comprises applying the previously described apparatus to a body-wearable article.

In another representative embodiment, an apparatus can comprise a body-mountable housing comprising a pressure sensor. The pressure sensor can comprise a well extending into a thickness of the housing, the well comprising an opening, a cavity having a diameter greater than the diameter of the well, a shoulder, and a depression, a membrane assembly disposed within the cavity, the membrane assembly comprising a membrane configured to rupture at a selected pressure threshold, and a sealing member disposed between the membrane assembly and the shoulder. The membrane assembly can have a diameter less than the diameter of the cavity such that air can pass around the membrane assembly and into the depression allowing air within the depression to equalize to a first pressure. When exposed to a pressure event of a second pressure the sealing member and the membrane assembly are configured to seal the depression.

In some embodiments, the pressure sensor is a first pressure sensor and wherein the apparatus comprises one or more additional pressure sensors.

In some embodiments, the sealing member comprises an O-ring.

In some embodiments, the housing comprises four pressure sensors, and wherein each pressure sensor has a different selected overpressure threshold.

In some embodiments, the membrane assembly further comprises first and second annular frame members between which the membrane is disposed.

In some embodiments, the membrane comprises a concave surface oriented toward the opening.

In some embodiments, the membrane assembly has a thickness less than a height of the central cavity such that the membrane can move within the cavity along a longitudinal axis of the well.

In some embodiments, the wells are open to the atmosphere at one end and closed at the opposite end.

In some embodiments, the well is a first well and wherein the housing comprises one or more additional wells and each additional well comprises a first diameter.

In still another representative embodiment, an apparatus comprises body-mountable housing comprising four pressure sensors disposed in a grid pattern. Each pressure sensor comprises a well having a first end portion open to the atmosphere and a second closed end portion, the well having a first diameter at the first and second end portions and comprising a cavity having a second diameter greater than the first diameter, a membrane assembly disposed within the cavity, the membrane assembly comprising one or more annular frame members and a membrane, and a sealing member disposed within the cavity between the membrane assembly and the second end portion. Each membrane assembly can move within its respective cavity allowing air to pass around the membrane assembly and into the second end portion. When exposed to a pressure event the membrane assembly is urged against the sealing member within the central cavity, sealing the second end portion. Each membrane is configured to rupture at a selected overpressure threshold and the selected overpressure threshold differs for each membrane of the four pressure sensors.

DETAILED DESCRIPTION

Figure 1:
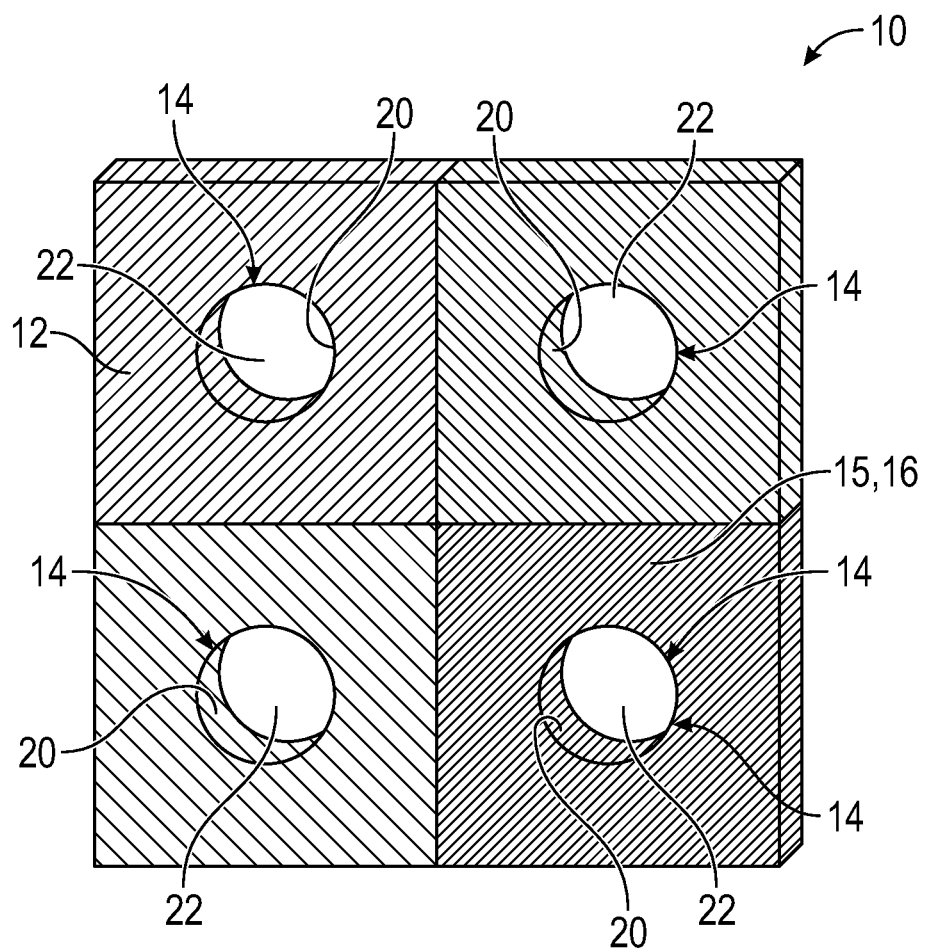
FIG. 1 is a top plan view of a pressure dosimeter, according to one embodiment.

The present disclosure pertains to systems that can be worn on a user's body, clothing, protective equipment, etc., and which are configured to record at least a threshold overpressure of a pressure event experienced by the user, such as a pressure wave or shockwave associated with an explosion. FIG. 1 illustrates a representative embodiment of a pressure sensor/meter/gauge, referred to herein as a pressure dosimeter 10. The pressure dosimeter 10 can comprise a main body or housing 12 including a plurality of pressure sensors 14 arranged in a spaced apart arrangement. In the illustrated embodiment, the pressure sensors 14 are arranged in a grid, however, in other embodiments, the sensors 14 can be arranged in any spaced apart arrangement such as a circle, half-circle, straight line, etc. In some embodiments, the location of the sensors 14 relative to one another can help indicate the severity or intensity of the pressure event.

Figure 2:
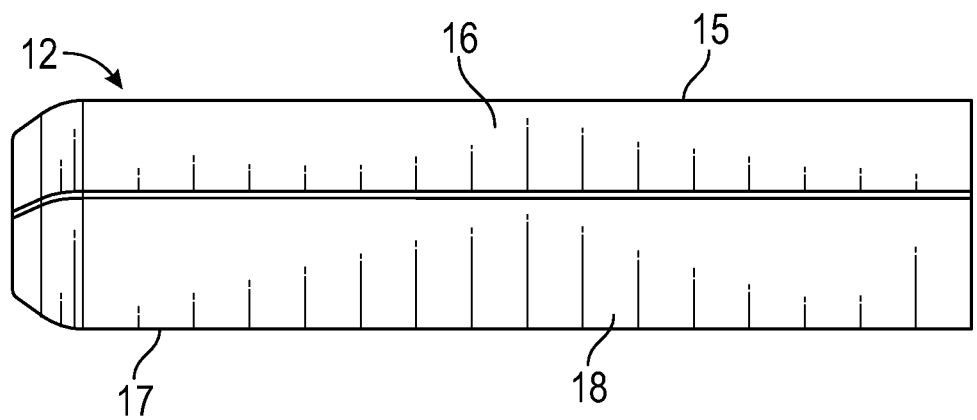
FIG. 2 is a side elevational view of the pressure dosimeter of FIG. 1.

With reference to FIG. 2, in certain embodiments the housing 12 can comprise a first or top portion 16 and a second or lower portion 18 together defining a thickness of the housing. In certain embodiments the top portion 16 and the lower portion 18 can be separately formed and secured together (e.g., using welding, adhesives, and/or mechanical means such as screws, etc.) to enclose the pressure sensors 14. In other embodiments, the housing 12 can be formed around the pressure sensors 14, such as by three-dimensional printing, injection molding, etc.

Referring again to FIG. 1, in certain embodiments, the pressure sensors 14 can be located in corresponding wells/recesses/bores/openings/windows 20 defined in the housing 12, with one end of the wells 20 being open to the atmosphere and the opposite end being closed by a rear wall 17 (FIG. 2) of the second portion 18 of the housing 12. The pressure sensors 14 can comprise respective membranes/diaphragms 22 extending across the wells 20. The membranes 22 can be inset relative to an outer surface 15 (FIG. 2) of the first portion 16 of the housing. In certain embodiments, the membrane 22 of each pressure sensor 14 can be configured to visually indicate exposure to a predetermined pressure threshold, for example, by rupturing, indenting, etc.

Figure 3:
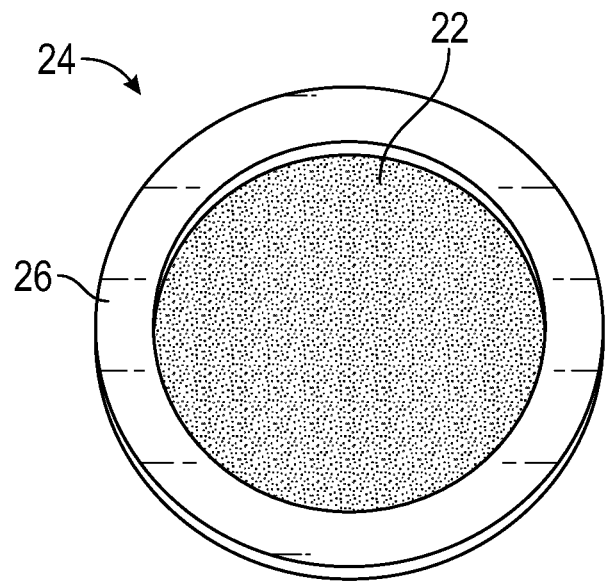
FIG. 3 is a perspective view of an exemplary membrane assembly of the pressure dosimeter of FIG. 1.

In some embodiments, the membranes 22 can be directly coupled or secured to the walls of the wells 20. In other embodiments, the membranes 22 can be integrated into inserts (e.g., referred to as a membrane assembly or rupture disk) received in the wells 20. For example, FIG. 3 illustrates a representative example of a non-reclosing membrane assembly configured as a rupture disk, pressure safety disk, burst disk, or burst diaphragm 24. In the illustrated configuration, the rupture disk 24 can comprise a membrane 22 secured to a circular frame member or support configured as a ring or collar 26.

Figure 4:
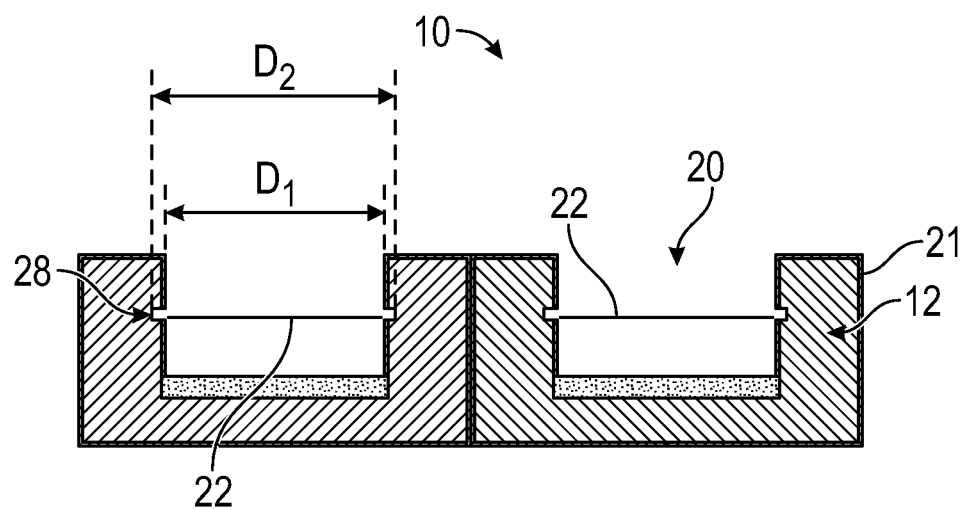
FIG. 4 is a cross-sectional side elevation view of the pressure dosimeter of FIG. 1.

FIG. 4 illustrates a cross-sectional view of the dosimeter 10. In certain embodiments, the wells 20 can have a first diameter $D_1$, and can define a chamber 28 inwardly offset from the opening 21 of the well 20 having a second, larger diameter $D_2$. In the illustrated embodiment, a rupture disk 24 can be positioned in the well 20 such that the membrane 22 is disposed in the chamber 28. In certain embodiments, the rupture disk 24 can be retained or secured in the well 20 by the chamber 28. In certain embodiments, each of the wells 20 can have the same, or substantially the same, first diameter $D_1$.

The membranes 22 of one or more of the pressure sensors 14 can be configured to rupture, indent, etc., upon exposure to a pressure wave of predetermined intensity. In certain embodiments, the pressure values at which the pressure sensors 14 are configured to rupture can be correlated with pressure thresholds (e.g., selected overpressure thresholds) at or above which identifiable injuries may occur to a wearer. For example, in certain embodiments the dosimeter 10 can comprise one or a plurality of pressure sensors configured to indicate exposure to overpressure events (e.g., events in which local air pressure exceeds normal ambient air pressure) associated with eardrum rupture (e.g., overpressure of 5 psi), asymptomatic neurological injury (e.g., overpressure of 10 psi), symptomatic neurological injury such as symptoms associated with concussion (e.g., overpressure of 20 psi), moderate neurological damage and/or lung damage (e.g., overpressure of 30 psi), critical neurological trauma and/or lung damage (e.g., overpressure of 50 psi), and/or fatal overpressure (e.g., overpressure of 90 psi). For example, in the illustrated embodiment the dosimeter 10 includes a grid of four pressure sensors 14 wherein each pressure sensor is configured to rupture at a different pressure threshold, but the dosimeter 10 may include any number of pressure sensors 14 configured to rupture at any pressure, including multiple pressure sensors 14 configured to rupture at the same pressure.

In certain embodiments, the membranes 22 can comprise any of various materials including metallic foils or films comprising aluminum, zinc, copper, gold, any of various steel alloys such as carbon steel, stainless steel etc., nickel alloys such as nickel-molybdenum or nickel-chromium-molybdenum alloys (e.g., HASTELLOY®), carbon-based materials such as graphite, polymeric materials such as polypropylene, polystyrene, polyvinyl chloride (PVC), low density polyethylene (LDPE), high density polyethylene (HDPE), biaxially-oriented polyethylene terephthalate (e.g., Mylar®), natural membranes such as cellulose or cellophane (e.g., nitrocellulose-lacquered cellophane), dialysis tubing, composite materials, etc.

In certain embodiments, the depth and/or shape of the wells 20, the diameter of the wells 20, the diameter and/or shape of the membranes 22, the material and/or thickness of the membranes 22, etc., can be configured or tuned such that the membranes rupture at pressures exceeding a predetermined threshold, such as any of the pressure thresholds noted above. In some embodiments, the wells 20 can be covered by, for example, a mesh screen to prevent dirt or debris from entering the wells 20.

Although the pressure sensors 14 are round in the illustrated embodiment, the pressure sensors can have any shape, for example, rectangular, square, triangular, ovular, etc. The wells may also have any diameter along their length/depth. One or more pressure sensors may be configured differently from the others according to the particular pressure threshold for which they are configured to indicate exposure.

In certain embodiments, the dosimeters described herein can be configured for mounting on a user's body, for example on equipment or clothing worn by the user (e.g., helmets, vests, headsets, etc.), and/or on the interior or exterior of vehicles, and/or on stationary objects such as buildings, or any other location or surface where exposure to overpressure events is desired to be monitored. See, for example, FIGS. 17-19.

In certain embodiments, the pressure sensors, areas of the housing around the pressure sensors, etc., can include visual indicia or markings (e.g., colors, patterns, values, etc.) indicating the minimum pressure threshold at which the associated membrane is configured to rupture. Thus, upon exposure to an overpressure event such as an explosion, the wearer, their team members, bystanders, medical personnel, etc., can examine the dosimeter to determine a minimum pressure threshold experienced by the wearer based on any ruptured membranes and the associated pressure value. This minimum pressure threshold can inform any likely injuries that may have been suffered by the wearer, and can be used to determine appropriate treatment. In some embodiments, the indicia or markings can be configured as, for example, an adhesive layer that can be disposed on an outer surface of the housing. In other embodiments, the indicia can be integral to the dosimeter, e.g., indicia can be painted directly onto a surface of the dosimeter, and/or the dosimeter can be formed from colored materials.

In certain embodiments, the dosimeter may include electronic pressure transducer(s), computer-readable storage memory, and/or transmitter, receiver, and/or transceiver capability for determining, recording/storing, and/or transmitting data of overpressure events experienced by the wearer. For example, in some embodiments, if a pressure event above a certain threshold is detected, the dosimeter can transmit a signal to a remote device. The signal can include the pressure data and/or the location/coordinates of the dosimeter (e.g., to facilitate rescue of the wearer).

Figure 5A:
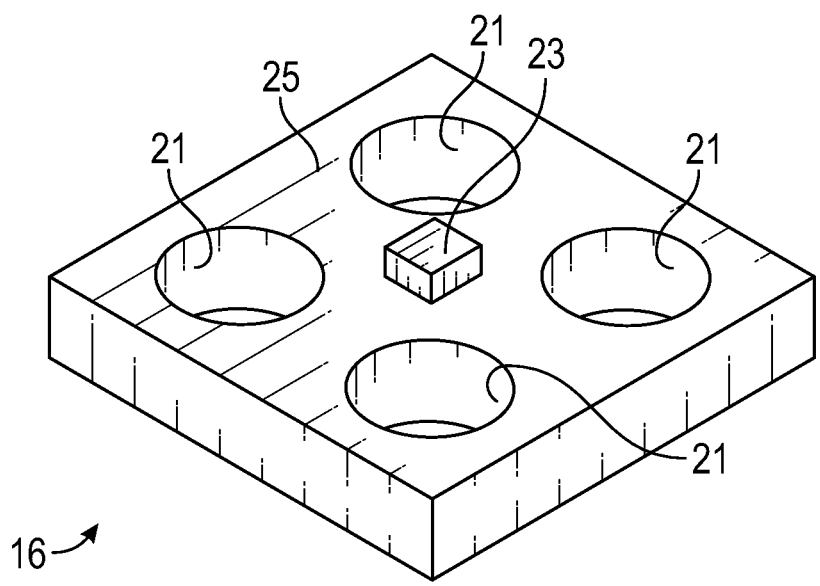
FIG. 5A is a perspective view of an upper portion of the housing of the pressure dosimeter of FIG. 1.
Figure 5B:
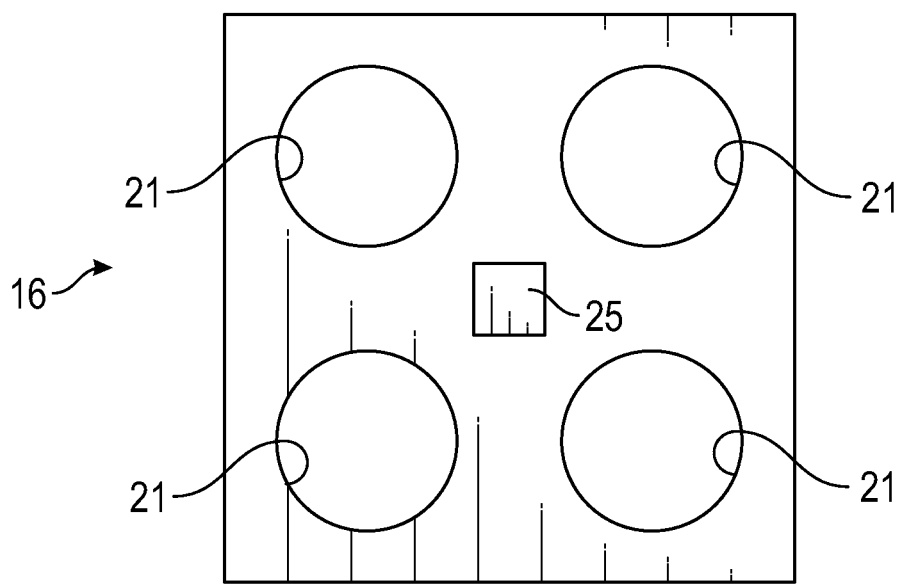
FIG. 5B is a bottom plan view of an upper portion of the housing of the pressure dosimeter of FIG. 1.
Figure 6A:
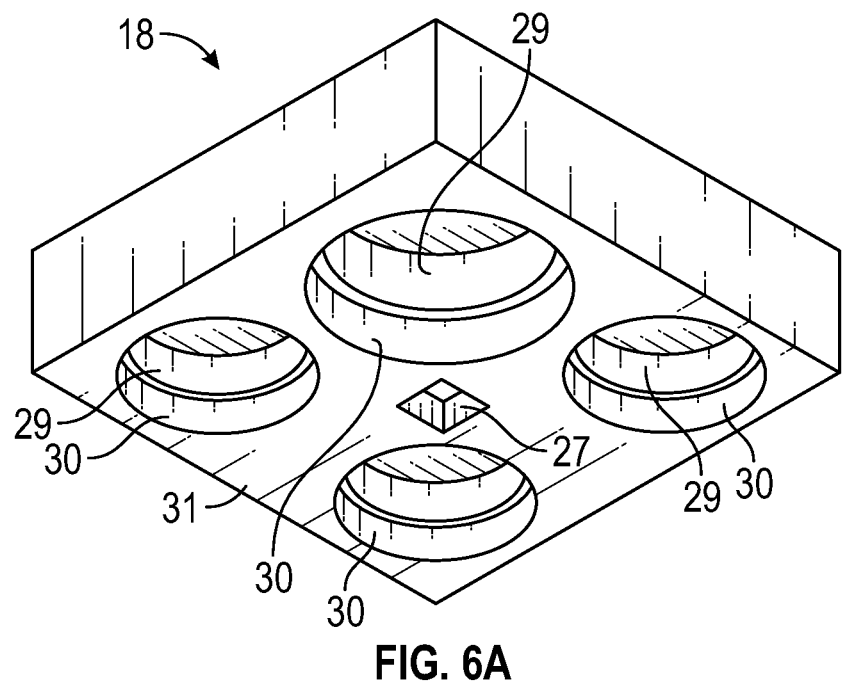
FIG. 6A is a perspective view of a lower portion of the housing of the pressure dosimeter of FIG. 1.
Figure 6B:
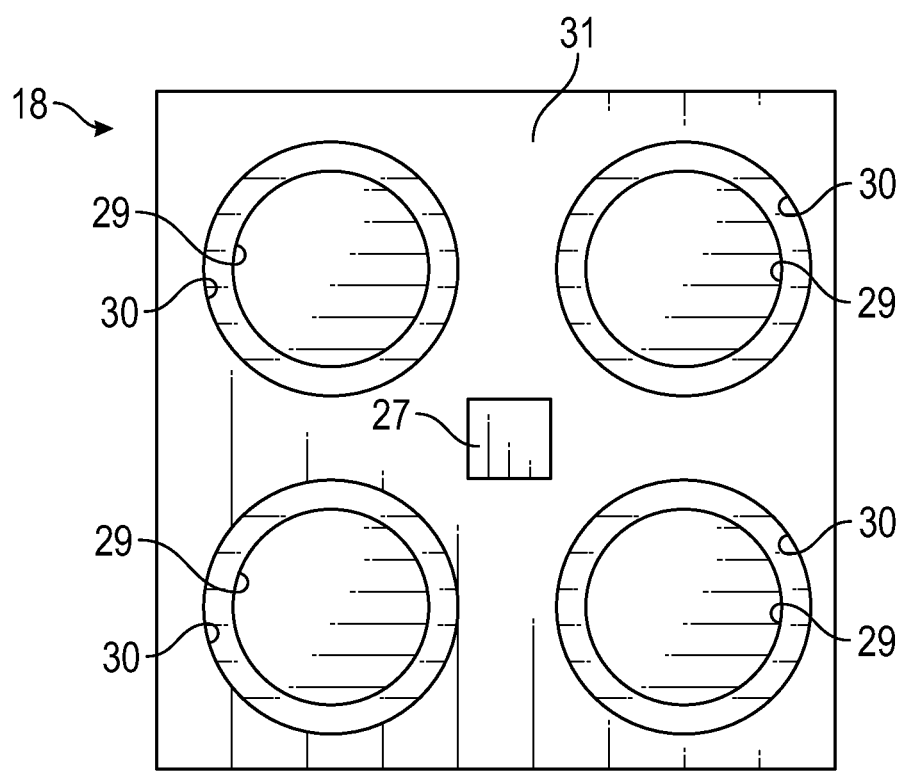
FIG. 6B is a top plan view of a lower portion of the housing of the pressure dosimeter of FIG. 1.

FIGS. 5A and 5B illustrate a representative configuration of the upper portion 16 of the housing 12, and FIGS. 6A and 6B illustrate a representative configuration of the lower portion 18 of the housing, according to one embodiment. Referring to FIGS. 5A and 5B, in the illustrated embodiment, the upper portion 16 comprises a plurality openings 21 (e.g., four openings) extending through the thickness of the upper portion 16. The upper portion 16 can further comprise a protrusion 23 extending from an inner surface 25. The protrusion 25 can be configured to mate with a corresponding recess or cutout 27 (FIG. 6A) in an inner surface 31 of the lower portion 18 of the housing 12 to couple the upper and lower portions 16, 18 to one another.

Referring to FIGS. 6A-6B, the lower portion 18 can comprise a plurality of depressions 29 extending into a thickness of the lower portion 18, and each surrounded by a recess 30. Each recess 30 can have a diameter greater than that of the depression 29, defining the chamber 28 when the upper and lower portions 16, 18 of the housing 12 are coupled/secured to one another.

Figure 7:
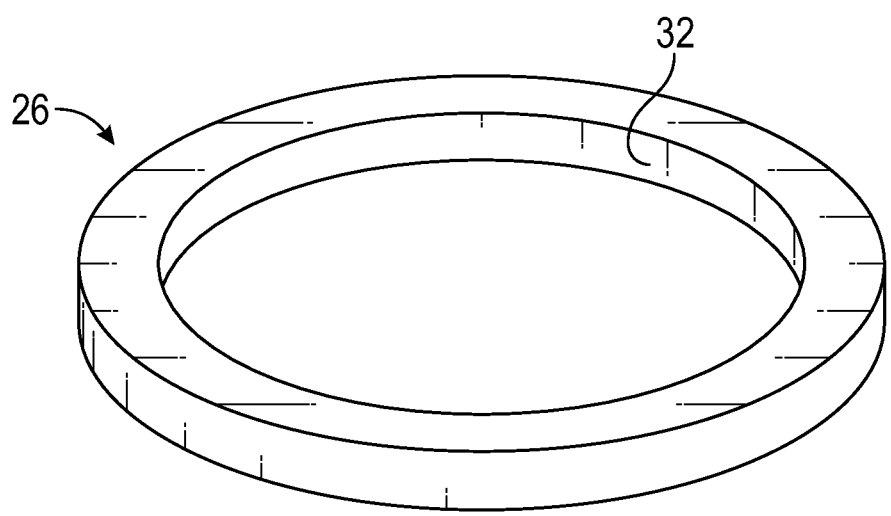
FIG. 7 is a perspective view of an annular frame member of the pressure dosimeter of FIG. 1.

FIG. 7 illustrates a representative embodiment of an annular frame member or ring 26. The ring 26 can include central opening 32 having a diameter that substantially corresponds with the diameter of the openings 21 and/or the depressions 29. In some embodiments, a membrane 22 can extend across the opening 32 to form the rupture disk, in other embodiments, a membrane can be sandwiched between two rings 26 to form the rupture disk.

Figure 8:
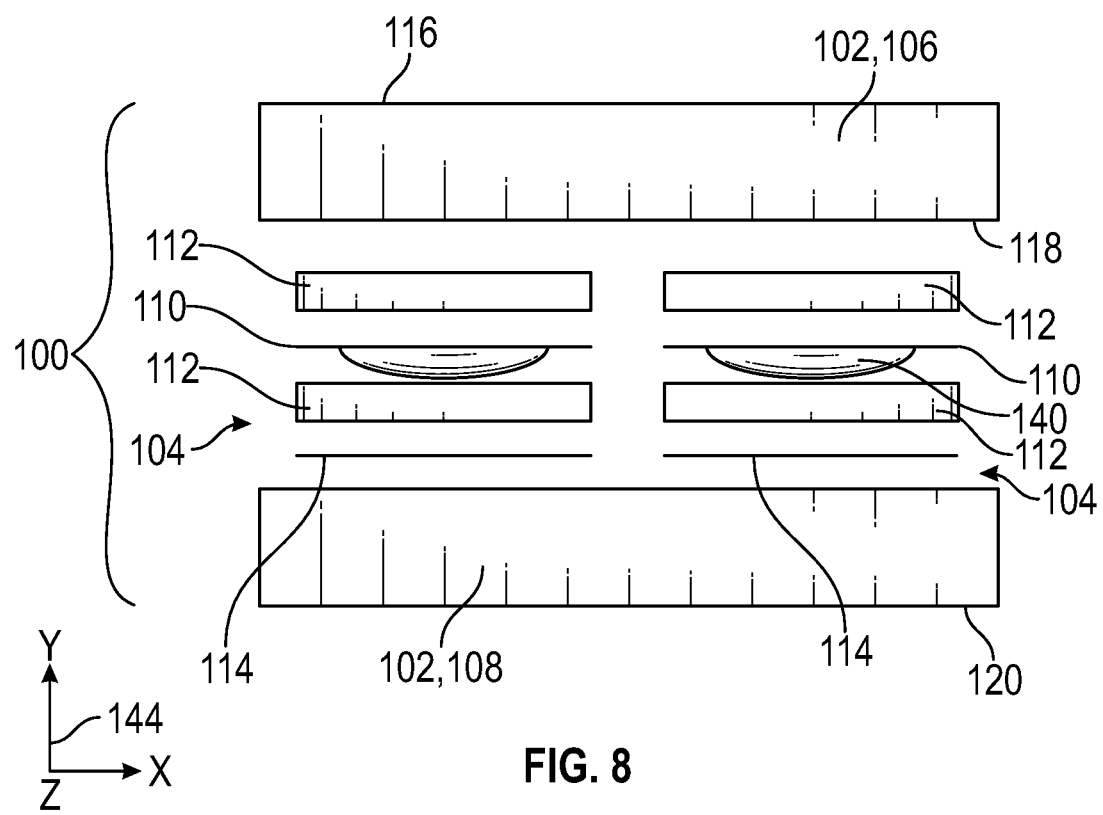
FIG. 8 is an exploded side view of a pressure dosimeter, according to one embodiment.

FIGS. 8-14 illustrate another embodiment of an exemplary pressure dosimeter 100. Dosimeter 100 can advantageously be configured to equalize to the atmospheric/ambient pressure in order to enable more accurate pressure event determinations. Similar to dosimeter 10, dosimeter 100 can comprise a main body or housing 102 including a plurality of pressure sensors 104 disposed in the housing and spaced apart from one another in a spaced apart arrangement (e.g., a grid, circle, half-circle, line, etc.). Referring to FIG. 8, dosimeter 100 can generally comprising a housing 102 and one or more pressure sensors 104. Each pressure sensor can include a well 103 (FIG. 13) extending into the housing 102, and a membrane 110, one or more frame members 112 configured to hold the membrane within the housing 102, and a sealing member 114 disposed within the well 103.

Figure 9:
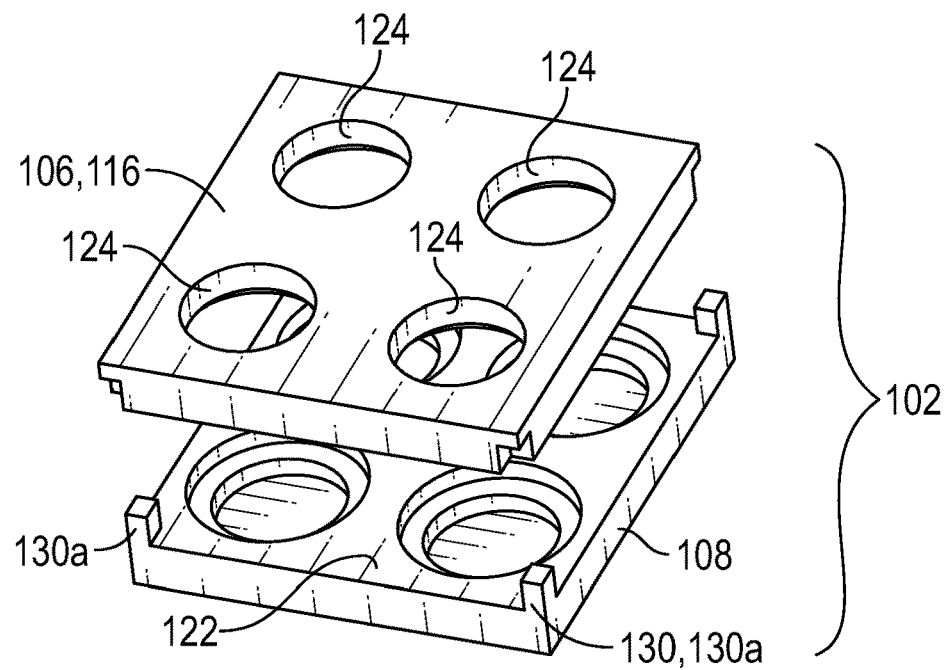
FIG. 9 is an exploded perspective view of a housing of the pressure dosimeter of FIG. 8.
Figure 10:
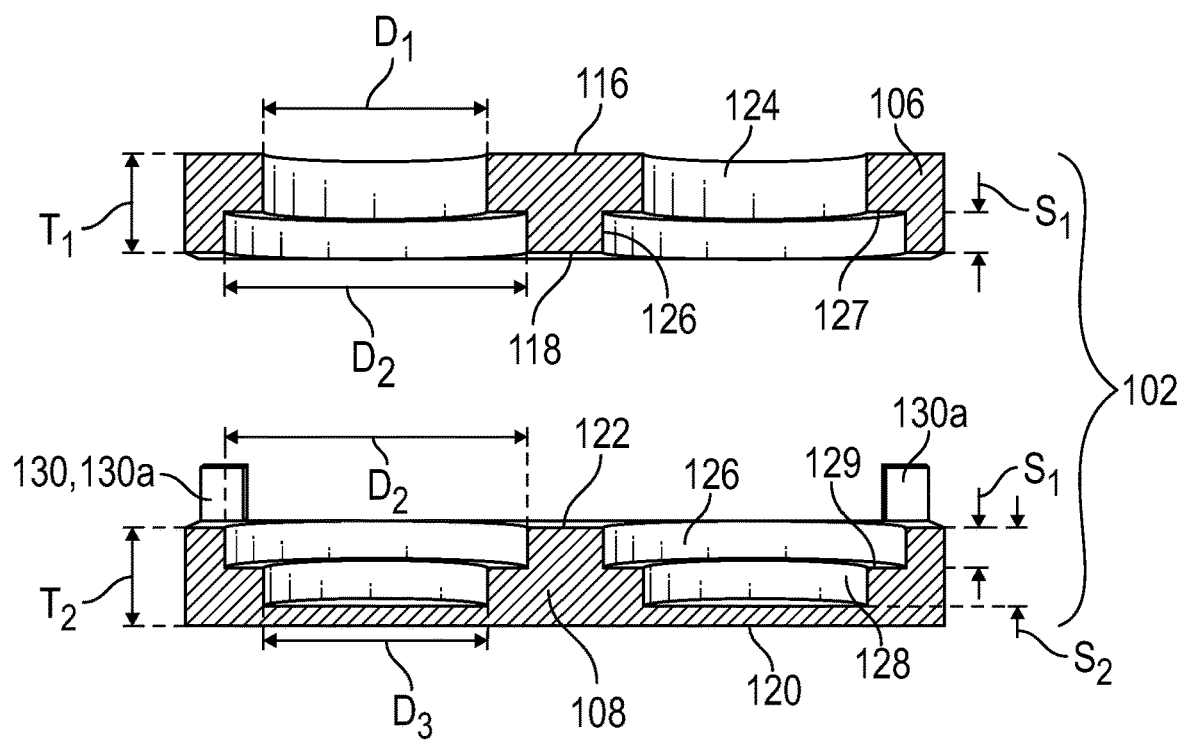
FIG. 10 is a cross-sectional side elevational view of the housing of FIG. 9.

Referring to FIG. 9, the housing 102 can comprise a first or upper portion 106 having a first or outer surface 116 and a second or inner surface 118 (FIG. 8), and a second or lower portion 108 having a first or outer surface 120 (FIG. 8) and a second or inner surface 122. The upper portion 106 can comprise a plurality of apertures or openings 124 extending through the thickness $T_1$ (FIG. 10) of the upper portion 106. As shown in FIG. 10, each opening 124 can be surrounded by a recess 126 in the inner surface 118. The recess 124 can extend into the thickness of the upper portion 106 a selected depth $S_1$, which can be less than the thickness $T_1$. Each opening 124 can have a diameter $D_1$ less than a diameter $D_2$ of the recess 126 such that the opening 124 and recess 126 form a stepped configuration in the manner of a counterbore. A surface/ledge/shoulder 127 can extend inwardly between the recess 126 and the recess 124 and can have a width substantially equal to the difference between the diameters D2 and D1. In some embodiments, the openings 124 can comprise a mesh screen configured to prevent dirt and/or debris from entering the pressure sensors 104.

The lower portion 108 can comprise a plurality of depressions/recesses 128 extending from the inner surface 122 into the thickness $T_2$ of the lower portion a selected distance $S_2$, which is less than the thickness $T_2$ of the lower portion 108. In other words, the depressions 128 do not extend fully through the lower portion 108, as shown in FIG. 9. Each depression 128 can be surrounded by a recess 126 in the inner surface 122. The recess 122 can extend into the thickness of the lower portion a selected depth $S_1$. In some particular embodiments, each depression 128 can extend 80% of the thickness $T_2$ of the lower portion 108. Each depression 128 can have a diameter $D_3$ less than the diameter $D_2$ of the recess 126 such that the depression 128 and recess 126 form a stepped configuration in the manner of a counterbore. A surface/ledge/shoulder 129 can extend around the circumference of the recess 126 similar to the surface 127 of the portion 106.

Figure 11:
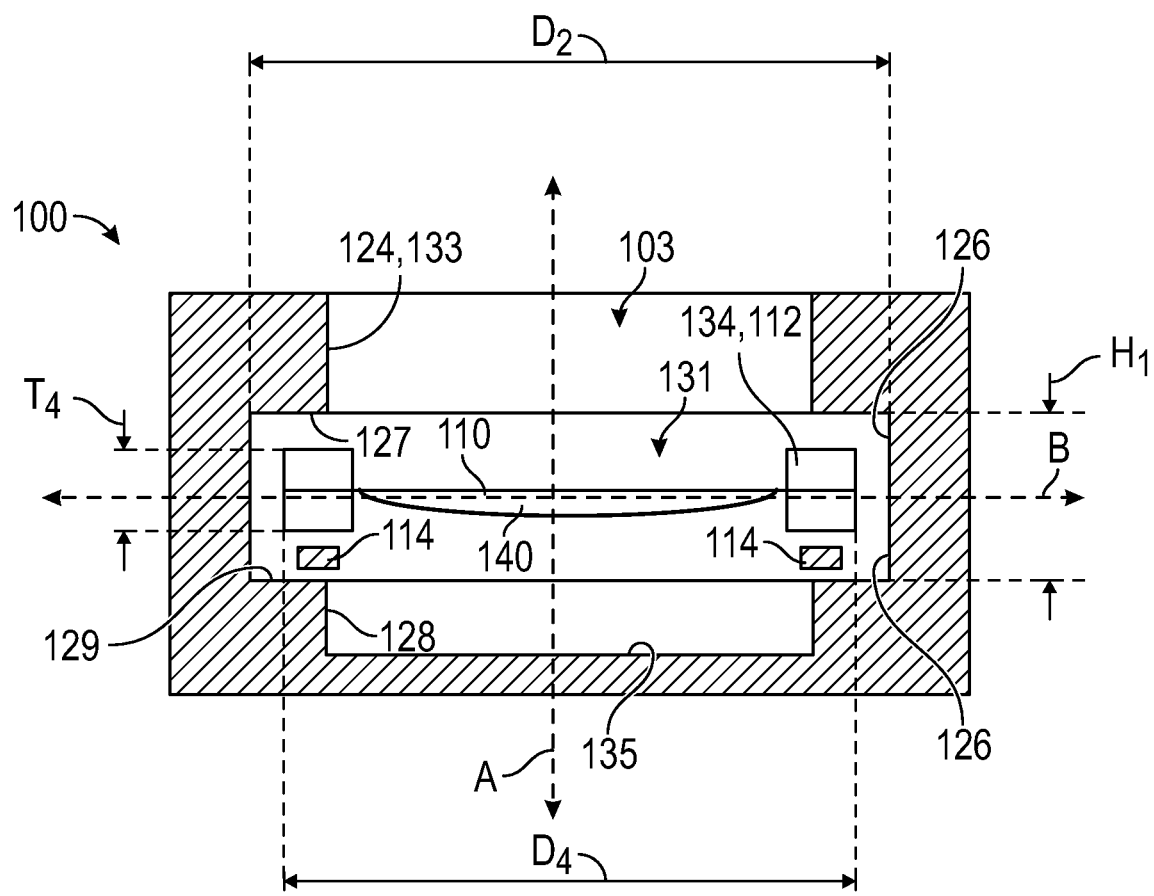
FIG. 11 is a cross-sectional side elevational view of a portion of the assembled pressure dosimeter of FIG. 8.

Referring to FIG. 11, when the upper and lower housing portions 106, 108 are coupled together, the openings 124 and depressions 128 define the wells 103 into which a plurality of membranes 110 and/or membrane assemblies 134 can be disposed. Each well 103 can have a first end portion 133 open to the atmosphere at opening 124 and a second end portion 135 defined by depression 128. The recessed portions 126 of the upper and lower housings 106, 108 define a cavity 131 within each well 103 between the first and second end portion 133, 135, the cavity 131 having a diameter $D_2$. As shown in FIG. 10, in some embodiments, each opening 124 and depression 128 can have the same diameter such that $D_1$ and $D_3$ are substantially equal. In other embodiments, the recessed portions, openings, and/or depressions can have varying diameters.

Figure 12:
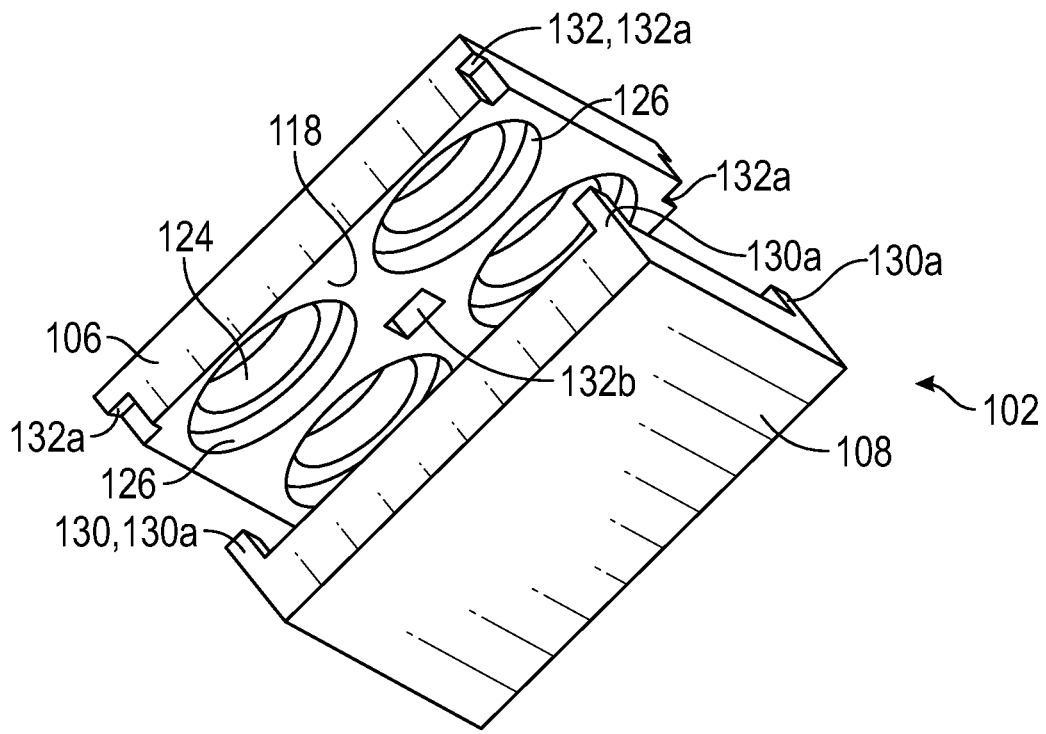
FIGS. 12-13 are perspective views of the housing of FIG. 8.
Figure 13:
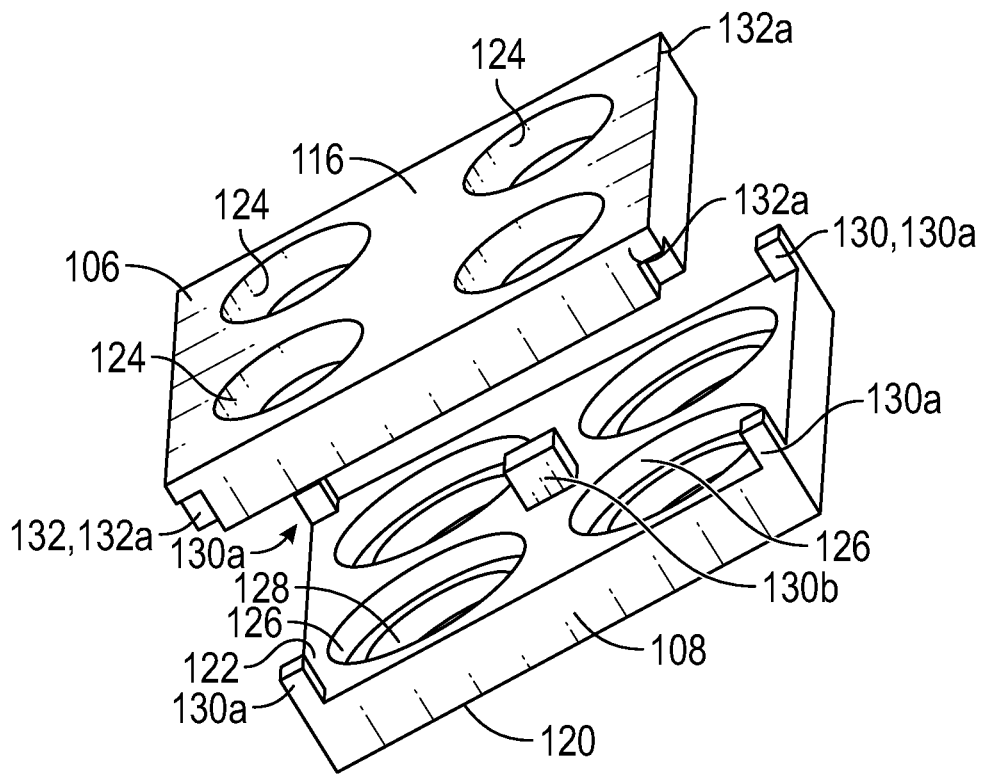

Referring to FIG. 13, the lower portion 108 can further comprise a plurality of protrusions 130 extending from the inner surface 122. For example, in the illustrated embodiment, the lower portion 108 can comprise five protrusions 130: four corner protrusions 130a and a central protrusion 130b. The corner protrusions 130a can each be disposed at a respective corner of the lower portion 108, and the central protrusion 103b can be disposed at a center portion of the lower portion 108. The upper portion 106 can comprise a plurality of corresponding cutouts 132 configured such that each protrusion 130 of the lower portion 108 can be disposed within a corresponding cutout 132. The cutouts 132 can extend from the inner surface 118 (FIG. 12) into the thickness $T_1$ (FIG. 10) of the first portion 106. In the illustrated embodiment, the upper portion 106 comprises five cutouts, four corner cutouts 132a and a central cutout 132b (FIG. 12). The central cutout 132b can have a shape corresponding to the shape of the central protrusion 130b, and the corner cutouts 132a can have shapes corresponding to those of the corner protrusions 130a. In the illustrated embodiment, all of the corner protrusions have the same shape, however, in other embodiments they can have varying shapes. In the illustrated embodiment, each corner protrusion 130a has a rectangular prism shape and the center protrusion 130b has a cube shape. However, in other embodiments, the protrusions 130 can have any of various shapes in including but not limited to cube, cuboid, rectangular prism, pyramid, cylindrical, etc. and the cutouts 132 can have any corresponding shape.

The housing 102 can comprise, for example, a high-density polymer configured to withstand blunt force impacts (e.g., of the type expected in military use). Though in the illustrated embodiment the housing 102 has a square shape in cross-section, in other embodiments, the housing can comprise rounded or chamfered corners. Such a configuration can advantageously mitigate the chances of the dosimeter 100 being inadvertently removed from a selected mounting location (e.g., by being knocked off). In still other embodiments, the housing 102 can have any of various shapes in cross section, including but not limited to circular, rectangular, triangular, oval, square oval, etc.

Figure 14:
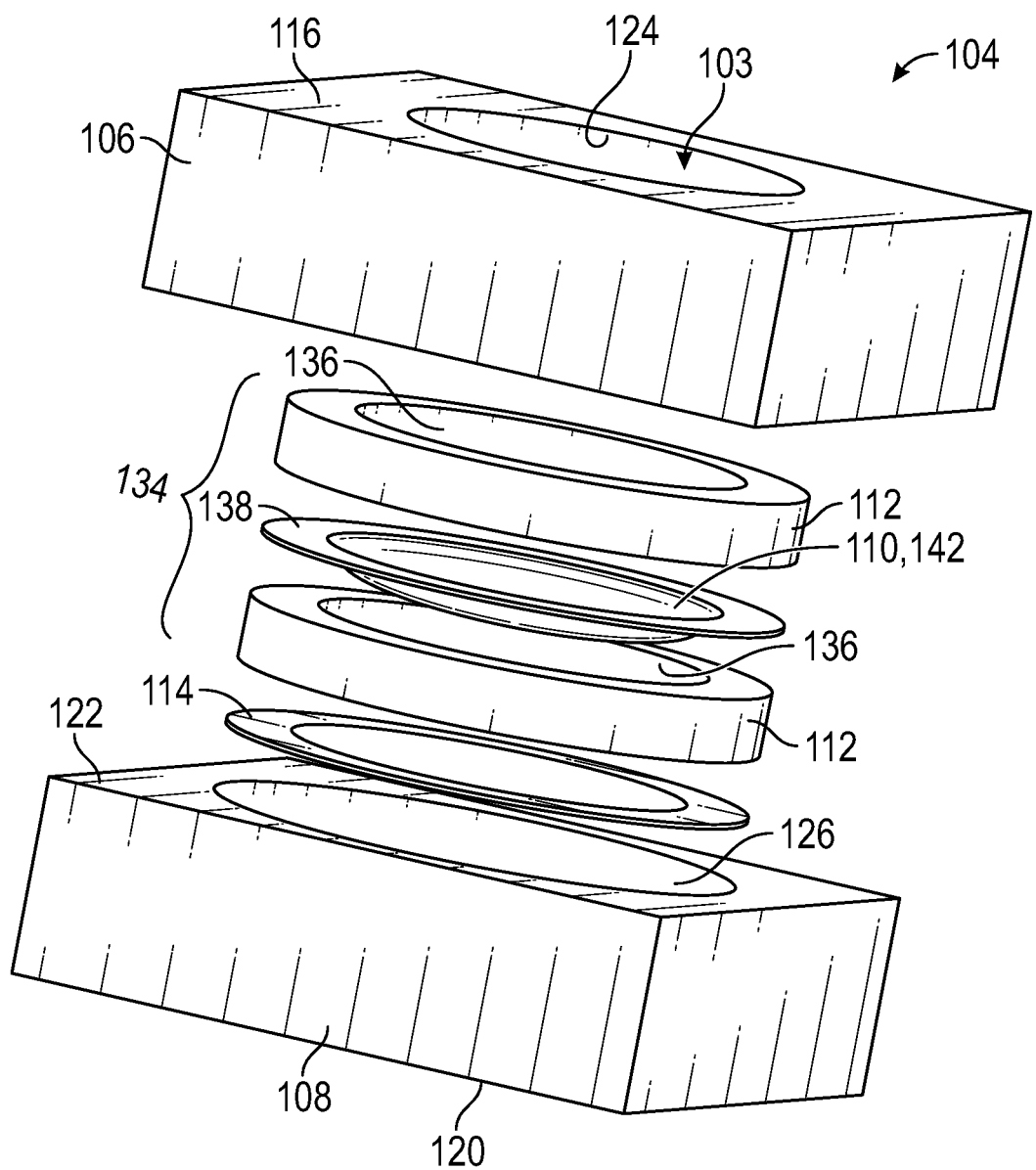
FIG. 14 is an exploded perspective view of a pressure sensor of a pressure dosimeter, according to one embodiment.
Figure 15:
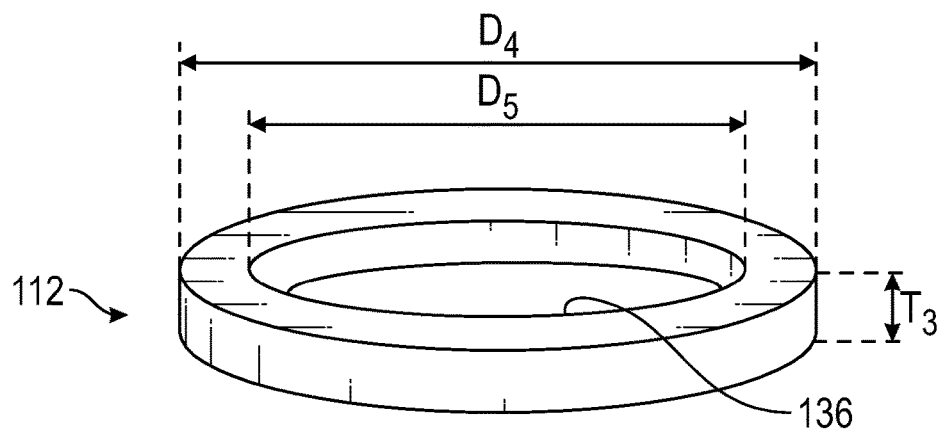
FIG. 15 is a perspective view of an annular frame member of the pressure sensor of FIG. 14.

Referring to FIG. 14, each pressure sensor 104 of the dosimeter 100 can comprise a membrane sub-assembly 134 including a membrane 110 disposed between first and second frame members 112. As shown in FIG. 15, each frame member 112 can comprise an annular member including a central opening 136. Each frame member 112 can have an outer diameter $D_4$ such that each frame member 112 can be disposed within the cavity 131 formed by the recessed portions 126. The central opening 136 can have a diameter $D_5$ corresponding to the diameter of the opening and depression $D_1$, $D_3$. Each frame member 112 can have a thickness $T_3$ slightly less than the depth $S_1$ of the recessed portion.

The frame members 112 can comprise, for example, a high-density polymer configured to withstand blunt force impacts (e.g., of the type expected in military use). Though in the illustrated embodiment, the frame members 112 have a circular shape in cross-section, in other embodiments, the frame members can have any of various shapes comprising a central opening and the recesses 126 can have a corresponding shape configured to accept the frame members 112.

Referring again to FIG. 14, as mentioned, the membrane sub-assembly 134 can comprise a membrane 110 disposed between a pair of frame members 112. The membrane 110 can be configured to rupture when a selected pressure threshold is reached. In other words, when a pressure on a first side of the membrane and a pressure on a second side of the membrane differ by a selected amount. In the illustrated embodiment, the membrane 110 can comprise an annular lip 138 surrounding a central concavity 140 (FIG. 8). In other embodiments, the membrane 110 can be substantially flat. The concavity 140 can be oriented such that the concave surface 142 faces the opening 124 advantageously increasing the surface area of membrane 110 exposed to the opening 124, which can improve the accuracy of the dosimeter 100. The annular lip 138 of the membrane 110 can be disposed between the frame members 112 to align the concavity 140 with the central openings 136 of the frame members.

Figures 16A, 16B:
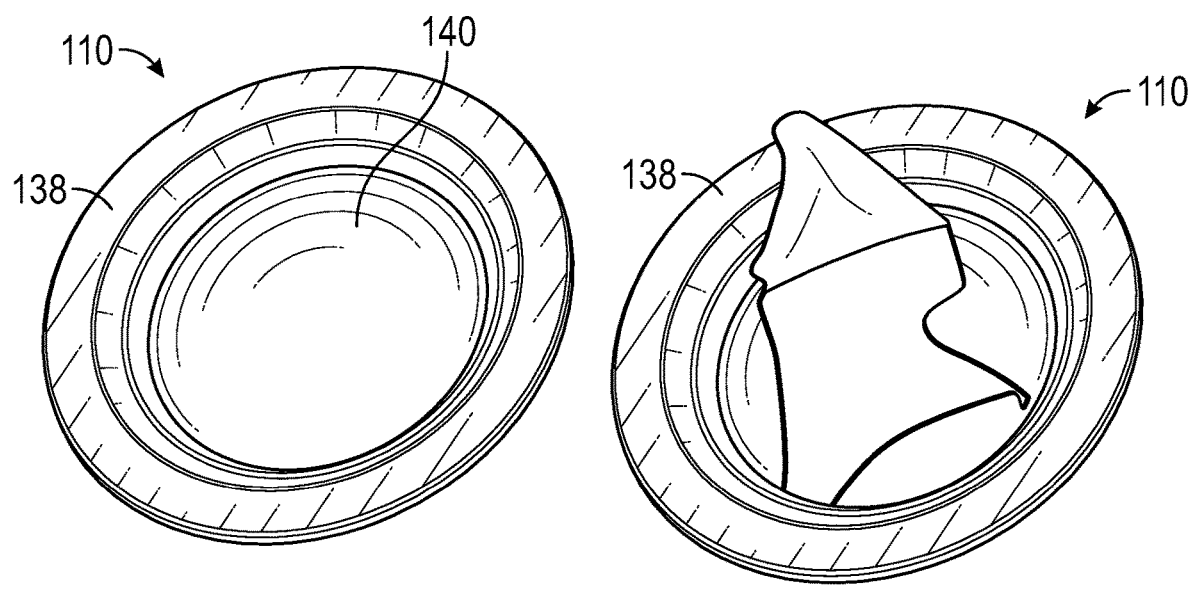
FIG. 16A is a perspective view of a membrane, according to one embodiment, shown in the un-ruptured configuration.
FIG. 16B is a perspective view of the membrane of FIG. 16A, shown in the ruptured configuration.

Similar to membrane 22, the membrane 110 can comprise any of various materials including metallic foils or films comprising aluminum, zinc, copper, gold, any of various steel alloys such as carbon steel, stainless steel etc., nickel alloys such as nickel-molybdenum or nickel-chromium-molybdenum alloys (e.g., HASTELLOY®), carbon-based materials such as graphite, polymeric materials such as polypropylene, polystyrene, polyvinyl chloride (PVC), low density polyethylene (LDPE), high density polyethylene (HDPE), biaxially-oriented polyethylene terephthalate (e.g., Mylar®), natural membranes such as cellulose or cellophane (e.g., nitrocellulose-lacquered cellophane), dialysis tubing, composite materials, etc. FIGS. 16A-16B illustrate the concave membrane 110 in a non-ruptured configuration (FIG. 16A) and a ruptured configuration (FIG. 16B). The membrane 110 can be configured to provide an instant response to an overpressure event (e.g., within milliseconds), and once the membrane 110 has ruptured it will not reseal. In some embodiments, a reflective material can be disposed behind the membrane (e.g., within the depression 128) to give a clear visible indication that the membrane 110 has been ruptured.

Referring again to FIG. 11, when the dosimeter 100 is assembled, the membrane sub-assembly 134 is disposed within the cavity 131 such that it has a small amount of tolerance/play/leeway in the X and Y directions (as shown on coordinate system 144 of FIG. 8) allowing the dosimeter 100 to adjust/equalize/equilibrate to the atmospheric and/or ambient pressure by allowing air to pass around the membrane sub-assembly 134. In other words, the thickness $T_4$ of the membrane sub-assembly 134 is less than a height Hi of the cavity 131 between the surfaces 127, 129 of the counterbores such that the membrane sub-assembly 134 is movable within the cavity 131 along a longitudinal axis A of the well 103. The diameter $D_4$ of the membrane sub-assembly 134 can also be less than the diameter $D_2$ of the cavity 131 such that the membrane sub-assembly is movable within the cavity 131 along a lateral axis B of the well 103. In some embodiments, the diameter $D_4$ of the membrane assembly can be, for example, 1%, 2%, 3%, 4%, 5%, 10% etc. less than the diameter $D_2$ of the cavity 131 and/or the thickness $T_4$ can be, for example, 1%, 2%, 3%, 4%, 5%, 10% less than the height Hi of the cavity 131. These dimensions are exaggerated in FIG. 11 for purposes of illustration.

Such a configuration allows the membrane 110 to respond more accurately to an overpressure event (e.g., an event where the pressure increases relative to atmospheric pressure). This is advantageous because atmospheric pressure varies and fluctuates with temperature, humidity, and elevation. Accordingly, the dosimeter 100 is configured to detect and indicate a selected relative overpressure threshold (e.g., a pressure event generating a 15 PSI blast) rather than a selected atmospheric pressure (e.g., 15 PSI of atmospheric pressure).

The dosimeter 100 can further comprise an annular sealing member 114 disposed within the recessed portion 126 of the second portion 108 of the housing 102. In some embodiments, the sealing member 114 can be a rubber O-ring. When the dosimeter 100 is exposed to rapid overpressure (e.g., an increase in pressure relative to the atmospheric pressure caused by a pressure event), the membrane sub-assembly 134 moves in the Y-direction against the sealing member 114, forming a seal between the membrane 110 and the depression 128. So sealed, the air contained within the depression 128 remains at the atmospheric pressure immediately prior to the overpressure (at least until deformation of the membrane), allowing the dosimeter 100 to measure/respond to the relative increase in pressure between the atmospheric pressure and the overpressure event.

As mentioned previously, the dosimeter 100 can comprise a plurality of pressure sensors 104. When mounted to a selected mounting surface, the dosimeter 100 can be oriented such that the openings 124 are open to the air (e.g., such that the lower housing portion 108 is positioned adjacent the mounting surface). Each pressure sensor 104 can be configured such that the membrane will rupture upon exposure to a pressure event of a selected overpressure threshold. As with dosimeter 10, the overpressure threshold for each pressure sensor 104 can be correlated with pressure thresholds at or above which identifiable injuries may occur to a wearer. For example, in the illustrated embodiment, the dosimeter 100 can comprise four pressure sensors 104 arranged in a grid pattern. A first pressure sensor can be configured to indicate exposure to overpressure events of 10 PSI or greater (e.g., associated with ear drum rupture and/or asymptomatic neurological damage), a second pressure sensor can be configured to indicate exposure to overpressure events of 15 PSI or greater, a third pressure sensor can be configured to indicate exposure to overpressure events of 20 PSI or greater (e.g., associated with symptomatic neurological damage), and a fourth pressure sensor can be configured to indicate exposure to overpressure events of 30 PSI or greater (e.g., associated with moderate neurological damage and/or lung damage).

Figure 17:
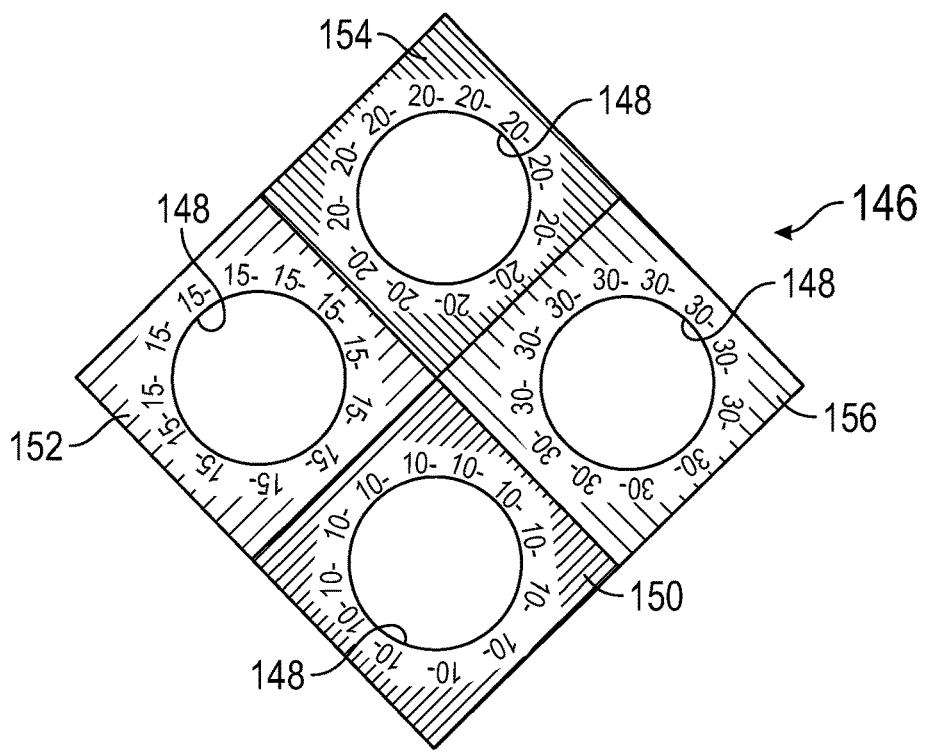
FIG. 17 is a top plan view of indicia for a pressure dosimeter, according to one embodiment.

As shown in FIG. 17, markings or indicia 146 may be used to visually indicate the selected overpressure threshold of each pressure sensor 104. The indicia 146 may be, for example, visual indicia including numbers, colors, words, letters, etc. and in some embodiments can indicate the severity of the potential injury to the wearer. In some embodiments, the indicia 146 may be a sticker or adhesive layer disposed on the outer surface 116 of the first portion 106 of the housing 102. As shown in FIG. 17, the indicia 146 can include apertures 148 (e.g., either apertures through the adhesive layer or areas of the surface devoid of markings) configured to align with the openings 126 such that the membrane 110 is visible through the apertures 148. In the illustrated embodiment, for example, the indicia 146 can comprise a first indicator 150 indicating that the associated pressure sensor is configured to rupture when exposed to an overpressure of 10 PSI or greater, a second indicator 152 indicating that the associated pressure sensor is configured to rupture when exposed to an overpressure of 15 PSI or greater, a third indicator 154 indicating that the associated pressure sensor is configured to rupture when exposed to an overpressure of 20 PSI or greater, and a fourth indicator 156 indicating that the associated pressure sensor is configured to rupture when exposed to an overpressure event of 40 PSI or greater.

Figure 18:
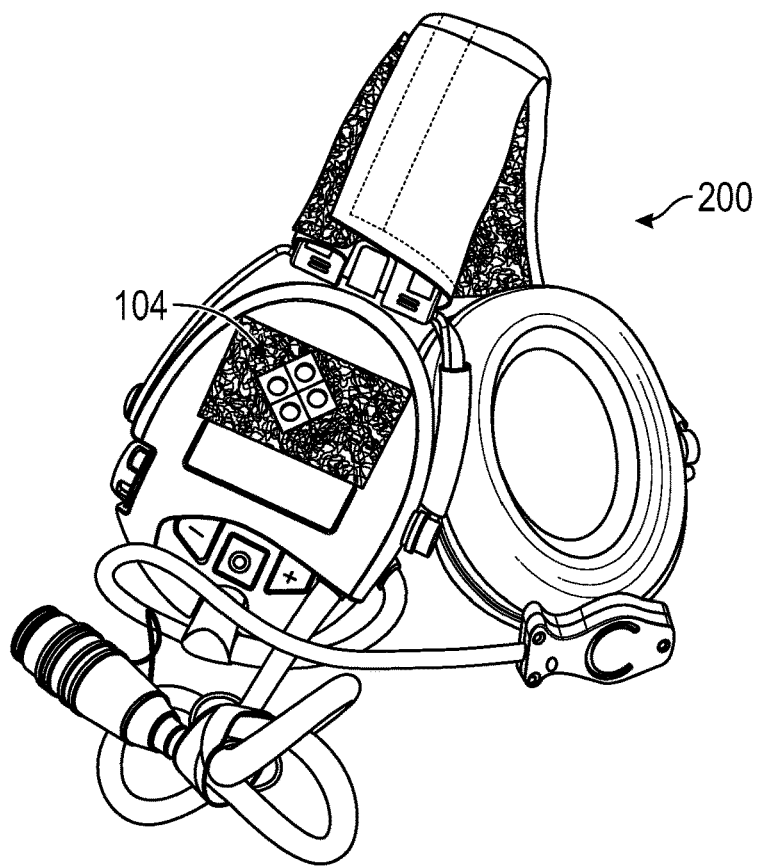
FIG. 18-20 show a pressure dosimeter mounted to various types of body-wearable equipment.
Figure 19:
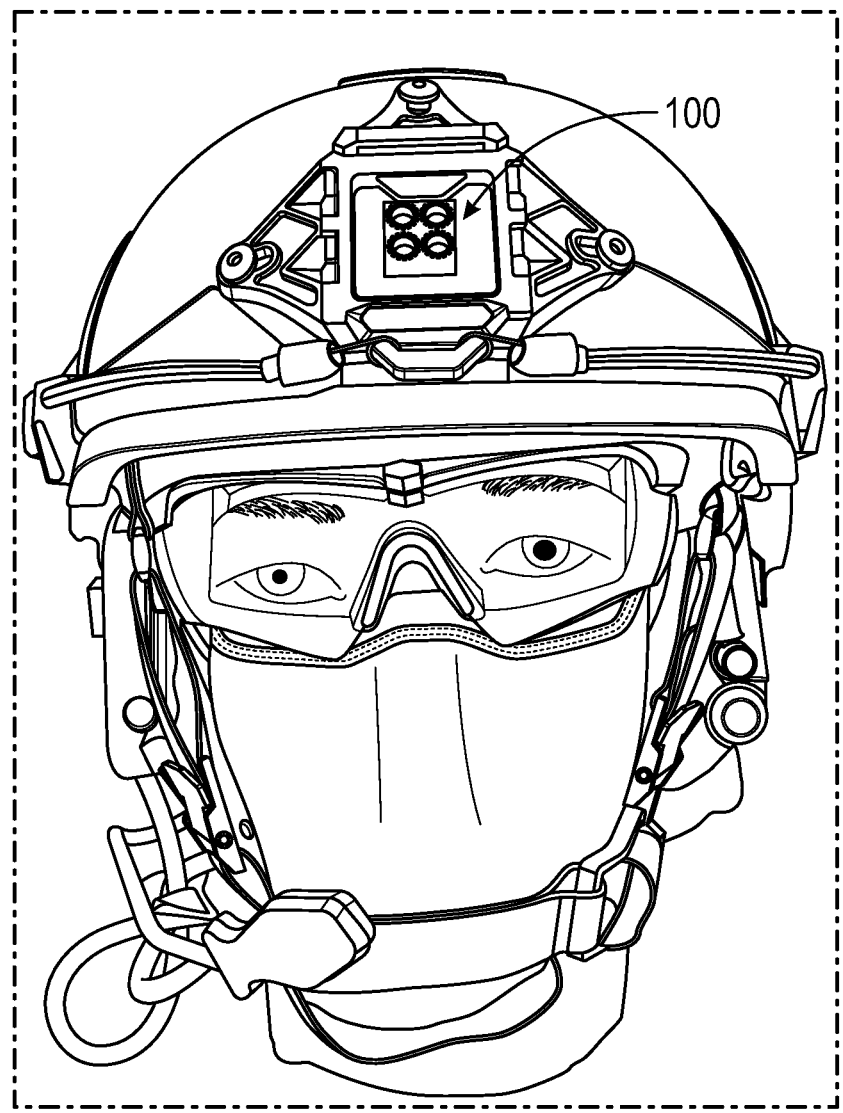

Referring to FIGS. 18-19, in some embodiments, the dosimeter 100 can be configured to be mounted on a user's body, for example, on clothing or equipment worn by the user (e.g., helmets, vests, headsets, etc.), and/or on the interior and/or exterior of vehicles, and/or on stationary objects or buildings, or on any other location where exposure to overpressure events is desired to be monitored. For example, the dosimeter 100 can be mounted to a user's hearing protecting headset 200 (see FIG. 18), or to a user's helmet 300 (FIG. 19). The dosimeter 100 can be mounted to the desired mounting surface using any of various methods. For example, the dosimeter 100 can be mounted using hook and loop closures (e.g., Velcro®), adhesives (e.g., double-sided tape, glue, and/or other adhesive), or mechanical fastening means such as screws, etc. In some embodiments, the dosimeter 100 can include an adhesive backing covered by a protective layer. To mount the dosimeter 100 to the selected mounting surface, the user can remove the protective layer and press the dosimeter against the selected mounting surface. In other embodiments, the dosimeter 100 can comprise a clip or fastening member on the housing 102. The fastening member can be configured to, for example, allow the dosimeter 100 to be clipped or hooked onto a surface (e.g., such as clothing, straps, or modular lightweight load-carrying Equipment (MOLLE) webbing). In other embodiments, the clip or fastening member can be configured to mate with a corresponding clip or fastening member on the mounting surface to couple the dosimeter to the mounting surface.

When mounted to a selected mounting surface, the dosimeter 100 can be oriented such that the openings 124 face the open air (e.g., such that the lower housing portion 108 is positioned adjacent the mounting surface). In embodiments wherein the dosimeter 100 comprises a clip, fastening member, and/or adhesive, such mounting means can be disposed on the lower portion 108 of the housing 102.

Figure 20:
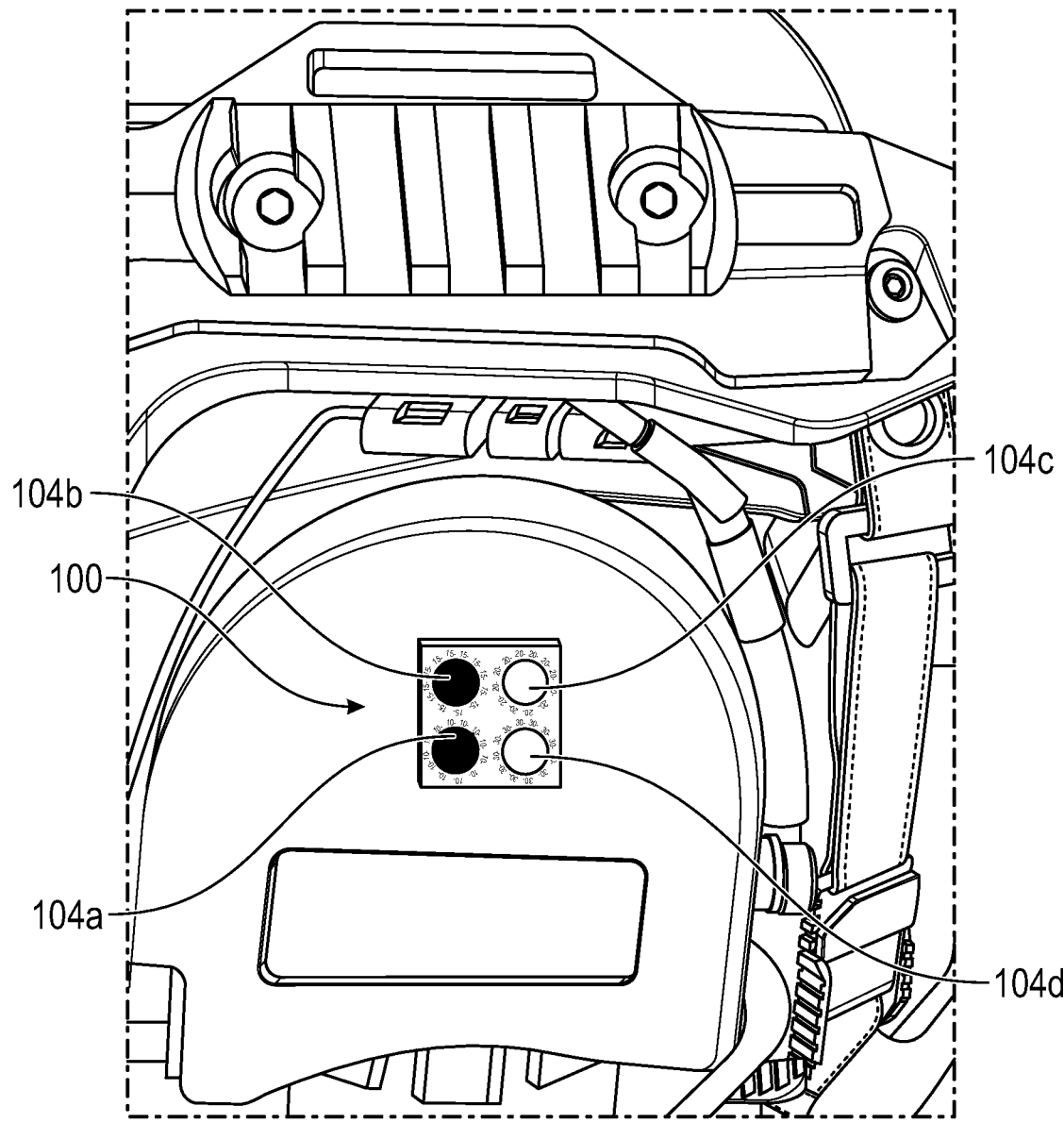

Upon exposure to an overpressure event (e.g., an explosion) the wearer, their team members, bystanders, medical personnel, etc., can examine the dosimeter 100 to determine a minimum overpressure threshold experienced by the wearer based on any ruptured membranes and the associated pressure value(s). This minimum overpressure threshold can inform any likely injuries that may have been suffered by the wearer and can be used to determine appropriate treatment. For example, FIG. 20 illustrates a dosimeter 100 in which the first and second pressure sensors 104a, 104b have ruptured but the third and fourth pressure sensors 104c, 104d remain intact, indicating that the dosimeter 100 was exposed to an overpressure event greater than or equal to 15 PSI.

In certain embodiments, the dosimeter 100 may include electronic pressure transducer(s), computer-readable storage memory, and/or transmitter, receiver, and/or transceiver capability for determining, recording/storing, and/or transmitting data of overpressure events experienced by the wearer. For example, in some embodiments, the dosimeter 100 can transmit a signal to a remote device if an overpressure event above a selected threshold is detected and/or can transmit the location/coordinates of the wearer to facilitate rescue.

In a particular embodiment, the dosimeter 100 can be configured with the following dimensions. The overall device can be 20 mm in length, 20 mm in width, and have a thickness of 5 mm. Each pressure sensor 104 can have an upper housing 106 of 10 mm in length, 10 mm in width, and 2.5 mm thickness. The opening 124 can be 6 mm in diameter, and the recessed portion 126 can be 8 mm in diameter. The lower housing 108 can be 10 mm in length, 10 mm in width, and 2.5 mm thickness. The depression 128 can be 6 mm in diameter, and the recessed portion 126 can be 8 mm in diameter. The lower housing 108 can comprise a 0.5 mm thickness between the outer surface 120 and the depression 128. The membrane assembly 134 can be slightly less than 8 mm in diameter, with an inner diameter of 6 mm, and a thickness of slightly less than 2 mm in height. Each sealing member 114 can have an 8 mm outer diameter and a 6 mm inner diameter. Accordingly, the dosimeter 100 can advantageously be small and lightweight, such that it can be carried by the user without effort.

Example 1

In a particular example, a dosimeter (e.g., such as dosimeter 10 described previously) can use pressure sensors having openings of equal size and membranes of varying thickness/strength corresponding to certain blast injury thresholds to determine the severity of an overpressure event to which a user has been exposed. The dosimeter can indicate different levels of pressure overexposure by means of visual appearance changes to a device worn on the body in close proximity to the head.

The dosimeter can comprise a plurality of pressure sensors including rupture disks contained within a housing. Rupture disks, also known as a pressure safety disks, burst disks, bursting disks, or burst diaphragms, are non-reclosing pressure relief safety devices that, in most uses, protect a pressure vessel, equipment or system from over-pressurization or potentially damaging vacuum conditions. In the specific embodiment described herein, the disks are used to visually signal certain overpressure level exposures.

Each rupture disk can measure, for example, 6 mm in diameter and can be sandwiched between two washers. Each washer can be 0.5 mm in height with an outer diameter of 6 mm and an inner diameter of 5 mm, creating a 5 mm diameter self-contained rupture disk. The housing compartment is made up of two components: 1) the face and 2) the back. The face measures 3 mm in thickness. The face features a window which is 5 mm in diameter. The back also measures 3 mm in thickness. The window on the back has an initial diameter of 6 mm for the first 1 mm in depth, and then has a diameter of 5 mm for the second 1 mm. The self-contained rupture disk sits within the 1 mm by 6 mm cylindrical chamber of the back housing compartment. The face component is then attached to the back, creating a 5 mm by 5 mm cylindrical channel with a rupture disk 3.5 mm deep.

The membrane of each rupture disk typically must be durable enough to withstand extreme temperatures and harsh environments (e.g., a non-rustable metal, alloy, etc.). The membrane can be comprised of one material or multiple materials, and the protective housing design can be altered to accommodate a custom number of indicator membranes. Accordingly, the device can be customized to meet selected exposure overpressure thresholds for each user/group of users. For example, the needs of military will likely vary from the needs of law enforcement and/or commercial end users. While the exact overpressure levels correlating to varying degrees of traumatic brain injury have not yet been established, monitoring exposure levels of a population over time will eventually lead to better diagnosis, care, and definitive outcomes.

Explanation of Terms

For purposes of this description, certain aspects, advantages, and novel features of the embodiments of this disclosure are described herein. The disclosed methods, apparatus, and systems are not limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved. The scope of this disclosure includes any features disclosed herein combined with any other features disclosed herein, unless physically impossible.

Although the operations of some of the disclosed embodiments are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed components can be used in conjunction with other components.

As used in this disclosure and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In some examples, values, procedures, or apparatus may be referred to as "lowest," "best," "minimum," or the like. Such descriptions are intended to indicate that a selection among many alternatives can be made, and such selections need not be better, smaller, or otherwise preferable to other selections.

In the description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Unless otherwise indicated, all numbers expressing material quantities, angles, pressures, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under test conditions/methods familiar to those of ordinary skill in the art. When directly and explicitly distinguishing embodiments from discussed prior art, the embodiment numbers are not approximates unless the word "about" is recited. Furthermore, not all alternatives recited herein are equivalents.

Although there are alternatives for various components, parameters, operating conditions, etc., set forth herein, that does not mean that those alternatives are necessarily equivalent and/or perform equally well. Nor does it mean that the alternatives are listed in a preferred order unless stated otherwise.

In view of the many possible embodiments to which the principles of the disclosure may be applied, it should be recognized that the illustrated embodiments are only examples and should not be taken as limiting the scope of the disclosure. Rather, the scope of the disclosure is at least as broad as the following claims. We therefore claim all that comes within the scope and spirit of these claims.

The invention claimed is:

1. An apparatus, comprising:
a body-mountable housing comprising a well having a first end portion open to the atmosphere and a second end portion that is closed, the well having a same first diameter at the first and second end portions and comprising a cavity having a second diameter greater than the first diameter;
a membrane assembly disposed within the cavity, the membrane assembly comprising one or more annular frame members and a membrane, the membrane assembly having a diameter less than the diameter of the cavity and a thickness less than a height of the cavity such that when in an unsealed configuration the membrane assembly is movable within the cavity along a longitudinal axis of the well and a lateral axis of the well thereby allowing air to pass around the membrane assembly and into the second portion;
a sealing member disposed within the cavity between the membrane assembly and the second end portion;
wherein the membrane assembly is configured to move from the unsealed configuration to a sealed configuration in which it is sealed against the sealing member within the cavity only when exposed to a pressure event to seal the second end portion; and
wherein when the membrane assembly is in the sealed configuration, the membrane is configured to rupture at a selected overpressure threshold.

2. The apparatus of claim 1, wherein the well is a first well, and wherein the body-mountable housing comprises one or more additional wells, and each additional well comprises the first diameter.

3. The apparatus of claim 1, wherein the sealing member comprises an O-ring.

4. The apparatus of claim 1, wherein the body-mountable housing comprises four wells, and wherein each well comprises a membrane having a selected pressure threshold that is different from the selected pressure thresholds of the other membranes.

5. The apparatus of claim 1, wherein the one or more annular frame members comprise first and second annular frame members arranged such that the membrane is disposed between them.

6. The apparatus of claim 1, wherein the membrane comprises a concave surface oriented toward the first end portion.

7. The apparatus of claim 1, wherein the body-mountable housing comprises a first portion and a second portion, the second portion including one or more protrusions extending from a first surface of the second portion, and the first portion including one or more cutouts configured to mate with the one or more protrusions to couple the first and second portions together.

8. The apparatus of claim 1, wherein the membrane assembly is inset relative to an outer surface of the body-mountable housing.

9. The apparatus of claim 1, wherein the membrane comprises a metallic foil.

10. A method, comprising:
applying the apparatus of claim 1 to a body-wearable article.

11. An apparatus, comprising:
a body-mountable housing comprising a pressure sensor, the pressure sensor comprising:
a well extending into a thickness of the body-mountable housing, the well comprising an opening having a diameter, a cavity having a diameter greater than the diameter of the opening, a shoulder, and a depression,
a membrane assembly disposed within the cavity, the membrane assembly comprising a membrane configured to rupture at a selected pressure threshold; and
a sealing member disposed between the membrane assembly and the shoulder;
wherein the membrane assembly has a diameter less than the diameter of the cavity and a thickness less than a height of the cavity such that when in an unsealed configuration the membrane assembly is movable within the cavity along a longitudinal axis of the well and a lateral axis of the well such that air can pass around the membrane assembly and into the depression allowing air within the depression to equalize to a first pressure; and
wherein only when exposed to a pressure event of a second pressure the membrane assembly is configured to move from the unsealed configuration to a sealed configuration in which it is sealed against the sealing member to seal the depression.

12. The apparatus of claim 11, wherein the pressure sensor is a first pressure sensor and wherein the apparatus comprises one or more additional pressure sensors.

13. The apparatus of claim 11, wherein the sealing member comprises an O-ring.

14. The apparatus of claim 11, wherein the body-mountable housing comprises four pressure sensors, and wherein each pressure sensor has a different selected pressure threshold.

15. The apparatus of claim 11, wherein the membrane assembly further comprises first and second annular frame members between which the membrane is disposed.

16. The apparatus of claim 11, wherein the membrane comprises a concave surface oriented toward the opening.

17. The apparatus of claim 11, wherein the well is open to the atmosphere at one end and closed at an opposite end.

18. The apparatus of claim 11, wherein the well is a first well and wherein the body-mountable housing comprises one or more additional wells and each additional well comprises a first diameter.

19. An apparatus, comprising:
- a body-mountable housing comprising four pressure sensors disposed in a grid pattern, each pressure sensor comprising:
- a well having a first end portion open to the atmosphere a second end portion that is closed, and a cavity disposed between the first and second end portions, the first and second end portions having a same first diameter and the cavity having a second diameter greater than the first diameter;
- a membrane assembly disposed within the cavity, the membrane assembly comprising one or more annular frame members and a membrane, the membrane assembly having a diameter less than the diameter of the cavity and a thickness less than a height of the cavity;
- a sealing member disposed within the cavity between the membrane assembly and the second end portion;
- wherein each membrane assembly can move within its respective cavity along a longitudinal axis of the well and a lateral axis of the well when in an unsealed configuration allowing air to pass around the membrane assembly and into the second end portion;
- wherein only when exposed to a pressure event the membrane assembly is urged against the sealing member moving from the unsealed configuration to a sealed configuration within the central cavity, sealing the second end portion;
- wherein each membrane is configured to rupture at a selected overpressure threshold; and
- wherein the selected overpressure threshold differs for each membrane of the four pressure sensors.

* * * * *